Patented May 7, 1935

2,000,152

UNITED STATES PATENT OFFICE 2,000,152

STABILIZATION OF FORMALDEHYDE SOLUTIONS

Joseph Frederic Walker, Perth Amboy, N. J., assignor to E. I. du Pont de Nemours & Company, Inc., Wilmington, Del., a corporation of Delaware No Drawing. Application June 29, 1932, Serial No. 619,957

29 Claims. (Cl. 23—250)

This invention relates to the stabilization of aqueous formaldehyde solutions.

Aqueous solutions of substantially pure formaldehyde containing not over 30% of the aldehyde are stable at temperature of 0° C. and above, i. e. no formaldehyde polymer will precipitate from such solutions at these temperatures. Hence, such a solution, if kept pure, need not be stabilized if it is to be stored and transported at temperatures not less than this limiting value.

Aqueous solutions of formaldehyde containing in excess of 30% by weight of formaldehyde, if allowed to stand at ordinary temperatures will precipitate formaldehyde polymer. At temperatures below 0° C. precipitation will occur in solutions containing less than 30% of formaldehyde, while at elevated temperatures the formaldehyde concentration may be increased to above 30% before precipitation occurs.

Heretofore, the precipitation of formaldehyde polymer from aqueous solutions such as the common 37% concentration has been prevented by the addition of methanol or ethanol. The stabilizing effect of these alcohols is rather mild and a considerable quantity must be added to prevent precipitation. Thus, 10%–12% by weight of methanol is required to stabilize, i. e. prevent polymer precipitation from, the commercial 37% or U. S. P. grade of formaldehyde at 0°–5° C. One of the disadvantages of this is seen when formaldehyde containing methanol is used, for instance, in the manufacture of artificial resins, for here the methanol is of no use and is wasted.

An object of this invention is to stabilize formaldehyde solutions against polymer precipitation by the use of other stabilizers than have been used heretofore, and particularly to effect this stabilization with smaller amounts of stabilizer. A further object is to produce stable formaldehyde solutions especially useful for manufacture of artificial resins. My invention also includes the novel and more useful products obtained by my method of stabilization.

These objects are accomplished by adding to a formaldehyde solution a water-soluble, organic nitrogen compound which reacts reversibly with formaldehyde in aqueous solution to form a loosely combined, water-soluble addition compound, and which has little effect upon the pH of formaldehyde solutions when added thereto.

As noted above, solutions of formaldehyde containing not over 30% of the aldehyde ordinarily are stable at temperatures of 0° C. or over. Stabilizers are almost always necessary, however, when solutions containing more than 30% of formaldehyde are to be handled. If such solutions containing more than 30% formaldehyde could be kept warm they would be stable, but ordinary handling and transportation does not permit of this. As noted, stabilization occurs because of the formation of reversible addition compounds in the formaldehyde. In general, I have discovered that if I add sufficient stabilizer to thus react with the amount of formaldehyde in excess of 30%, i. e. the amount available for paraform formation at 0° C., the aqueous solution will behave under reduced temperatures like a 30% solution. Thus, the efficiency of a stabilizer is somewhat dependent on its reactivity, i. e. the amount of formaldehyde available for a paraform formation at the limiting temperature with which it will reversibly react.

A great number of organic nitrogen compounds are known, but not all of them are stabilizers for formaldehyde solutions. I have discovered that those water-soluble, non-alkaline, organic nitrogen compounds which react reversibly with formaldehyde in aqueous solution to form water-soluble, loosely combined products and which do not alter the pH values of the solution appreciably are excellent stabilizers; that is, they inhibit the precipitation of polymer from aqueous formaldehyde solutions when added thereto in proper amount, even when the solutions are exposed to low temperatures, for instance 0° C. or lower. In general, then, the stabilizers are neutral or weakly acid compounds which are not highly ionized in aqueous solution so that they have little or no effect on its pH value.

I have discovered that the pure formaldehyde solutions are most stable when the pH of solution is between 2 and 4.5. Compounds which when dissolved in pure formaldehyde solutions produce pH values outside of this range tend to cause the precipitation of paraform and polyoxy-methylene types of polymers. Such catalysts of polymer precipitations are, for example, hexamethylenetetramine, acetic acid, formic acid, and the like. Solutions stabilized in accordance with my invention, however, are not so sensitive to pH changes; hence if the pure formaldehyde solution at a pH of 2–4.5 is stabilized according to my invention, the pH may later be adjusted or changed to a considerable degree with comparatively little loss in stability. Thus, for example, if a solution of formaldehyde having a pH of 2-4.5 is stabilized with urea, one of the examples of my class of stabilizers, the pH of the solution can be changed to 7 without great loss of stability.

Strongly acidic or alkaline compounds which have a great effect on the pH, i. e. cause changes of more than 1 in the pH value, tend to act as formaldehyde polymerizers and do not stabilize formaldehyde solutions. These compounds, added to aqueous formaldehyde solutions, form water-soluble addition compounds with the formaldehyde only to very small extent if at all, indicating that what is formed in the solution apparently is the ionized form of the added agent rather than a formaldehyde addition compound. Hence, the concentration of formaldehyde available for polymer formation at any critical temperature is not appreciably lowered by the addition of these substances. On the other hand, the weakly acid or weakly alkaline materials which form the stabilizers of this invention react reversibly to form soluble addition compounds with formaldehyde in almost stoichiometrical proportions.

Compounds which react irreversibly with formaldehyde to form insoluble substances, compounds which are hydrolyzed by water to produce compounds which in turn may react non-reversibly with formaldehyde to produce insoluble compounds, or acid or alkaline compounds which are sufficiently highly ionized to catalyze polymer precipitation are not formaldehyde stabilizers. Methyl formate, for example, acts as a formaldehyde polymerizer because of the formic acid set free when it is hydrolyzed. On the other hand, some compounds behave like formaldehyde stabilizers because when they are hydrolyzed in formaldehyde solutions, stabilizers are produced. For example, acetal is hydrolyzed to form ethanol, a stabilizer, and acetaldehyde; such compounds, however, are not to be classed as stabilizers within this invention except insofar as the hydrolyzed product itself may be one of my class of stabilizers.

As indicated above, the pH value of the formaldehyde solutions before and after stabilization are of importance and must be considered in the preparation of any stable solution. While I have attempted to give some generalizations, it must still be recognized that the stability may be subject to variations as the pH is changed. Furthermore, a compound may be a stabilizer at one adjusted pH value, but not be a stabilizer if the solution is adjusted to some other pH value. Moreover, the concentration of the stabilizer must be considered in connection with the pH value of the solution. I have found the amount of stabilizer which may be added to a formaldehyde solution at any given pH value may be limited, that is if more than a certain limiting amount of stabilizer is added within that pH range, the stabilizer tends to react irreversibly and to precipitate solids at ordinary temperatures. However, if the pH value is sufficiently changed in the proper direction, a larger amount of the stabilizer may be added, resulting in increased stability. Such limiting stabilizer concentrations and pH values may vary for the different stabilizers and may be readily determined by simple tests.

Urea is an example of my class of stabilizers. This compound reacts with formaldehyde at relatively low temperatures, for instance, 10° C. to 30° C., to form methylol urea and dimethylol urea. The reaction is reversible, so that the reactants are probably in equilibrium with the product as follows:

$$\text{Urea} + CH_2O \rightleftarrows \text{methylol urea} + CH_2O \rightleftarrows \text{dimethylol urea}$$

I have found that dimethylol urea itself is a stabilizer for formaldehyde solutions, but is less powerful than urea. This is probably because the dimethylol urea partially decomposes to form urea and formaldehyde.

If urea is added to a formaldehyde solution having a pH of 2 to 4.5 in amounts up to 5% by weight, it reacts reversibly with the formaldehyde as shown above and stabilizes the solution. If more than 5% of urea is added to this solution, the excess urea reacts irreversibly and tends to precipitate solid material at ordinary temperatures. However, if the solution is first made less acid, more than 5% of urea may be added to produce a stable solution without precipitation. For instance, if the acidity is reduced to a pH of 7, 8% of urea may be added without precipitation and thereby a solution is produced which is more stable than the solution containing 5% of urea and having a pH or 2-4.5. Hence, it appears that although some decrease of stability may occur because of the change in acidity to a pH of 7, this is more than compensated for by the powerful stabilizing effect of the added 3% of urea.

I have found the following organic nitrogen compounds to be suited for stabilizing formaldehyde solutions according to my invention:

| | |
|---|---|
| Urea | Methyl urea |
| Thiourea | Glycine |
| Acetoxime | Dimethylol urea |
| Chloracetamide | Nitroguanidine |
| Diethyl thiourea | Formamide |

As noted above I have found that in general unstabilized aqueous solutions of pure formaldehyde are most stable when their acidities are within the range of pH 2-pH 4.5. However, the acidity of solutions stabilized according to my invention may be varied over a range of pH 2-pH 7 without substantial decrease of stability. If it is desired to produce a stable solution having a pH of 4.5-7, the acidity may be adjusted either before or after adding the stabilizer. If the acidity is adjusted to a point outside of the range of pH 2-4.5 before adding the stabilizer, the solution must be maintained at an elevated temperature (the minimum temperature depending on the formaldehyde concentration) to prevent precipitation of polymer until the stabilizer has been added and has become effective as described below.

Likewise, if the acidity of the formaldehyde solution immediately after its manufacture lies outside the pH range of 2-4.5, it may be stabilized (a) by maintaining it at the required elevated temperature, adding a stabilizer in amount not incompatible with the existing pH and then allowing to cool or (b) first adjusting the acidity to the desired pH value and then adding the stabilizer.

When a formaldehyde solution is stabilized in accordance with my invention, the solution usually does not immediately attain its maximum low temperature stability, but the stability gradually increases on standing. In general, the solution must be allowed to stand not less than 10 hours, for instance, 12 to 13 hours, at a temperature not less than about 20° C. before it attains this maximum stability. However, at higher temperatures the maximum stability is reached more quickly; for instance, if the solution is heated to boiling, the maximum stability is obtained practically at once. Hence, solutions stabilized according to my process are preferably brought to their state of maximum stability either by standing at room temperature for 12 to 13 hours, or by heating, before being exposed to lower temperatures.

My improved stabilizers may be used to increase the stability of a solution which has already been partially stabilized by means of methyl or ethyl alcohol. For example, I have found that when both methanol and one of my stabilizers are added to the same solution, each acts independently to prevent precipitation of polymer. Hence, less of my stabilizer is required to stabilize a solution containing methyl or ethyl alcohol than is necessary to stabilize an alcohol-free solution to the same extent. Likewise, my invention also comprises the addition of a plurality of my improved stabiliezrs.

Example I

Various amounts of urea, thiourea and water were added to a pure 40% formaldehyde solution in order to obtain solutions all containing 37% by weight of formaldehyde and varying percentages of urea and thiourea. These solutions were allowed to stand at room temperature for at least 13 hours and were then maintained at a temperature of 5°-7° C. for one month. With these solutions was stored a 37% formaldehyde solution containing 10% by weight of methanol. By these experiments I determined the minimum concentrations of urea and thiourea necessary to obtain a degree of stabilization equivalent to or slightly greater than that obtained with 10% of methanol. These minimum concentrations were: urea, 5% by weight, thiourea, 6% by weight.

Example II

Eight grams of thiourea was dissolved in 92 grams of a methanol-free, 40% formaldehyde solution. One-half of this solution was placed immediately in a refrigerator, where the temperature was maintained at 0° C. to 5° C. The other half of the solution was allowed to stand 14 hours at room temperature (above 20° C.) and was then placed in the same refrigerator. The first half of the solution precipitated polymer within a few hours; the second half remained clear after standing at 0° to 5° C. for several months.

In the above examples I have illustrated the use of urea and thiourea in specific concentrations and under specific rigorous conditions to illustrate the great usefulness of my invention. These concentrations are not to be regarded as limiting, since obviously stability to a greater or less degree can be secured by using more or less stabilizer. Furthermore, stability under less rigorous conditions, i. e. lower concentration of formaldehyde or relatively higher temperatures, can be secured with smaller amounts of the stabilizers. The practical limits of stabilizer concentration are easily determined by storage tests such as described above. This can be done with my stabilizers used alone, in combination with each other, or in combination with methyl or ethyl alcohol.

My invention is especially useful in preparing stable formaldhyde solutions that are to be used in the manufacture of artificial resins by the condensation of formaldehyde with organic nitrogen compounds, for instance, ureau or thiourea. When formaldehyde solutions so used are stabilized with methyl or ethyl alcohol, the latter does not enter into the condensation reaction and is wasted. Utilizing my invention the organic nitrogen compound used as stabilizer, for instance, urea, may take part in the condensation and hence no part of the stabilized solution is wasted.

Another advantage of my stabilizers is that in general they have greater stabilizing effects than substances heretofore used or proposed and hence may be used in smaller quantities.

In the appended claims, I use the term "stabilizing amounts" to designate amounts of a stabilizing substance sufficient to inhibit the formation of insoluble formaldehyde polymers in the formaldehyde solution, but insufficient to react irreversibly therewith and thereby to precipitate solid reaction products of formaldehyde and the stabilizing substance.

I claim:

1. A method for preventing polymer precipitation in an aqueous formaldehyde solution comprising adding thereto stabilizing amounts of a water-soluble, organic nitrogen compound capable of reversibly reacting with formaldehyde at temperatures below 30° C. to form a water-soluble compound.

2. A method for preventing polymer precipitation in an aqueous formaldehyde solution comprising adding thereto stabilizing amounts of a water-soluble, organic nitrogen compound capable of reversibly reacting with formaldehyde at temperatures below 30° C. to form a water-soluble compound, and maintaining said solution at a temperature above about 20° C. for at least 10 hours before subjecting it to lower temperatures.

3. A method for preventing polymer precipitation in an aqueous formaldehyde solution comprising adding thereto 5-10% by weight of a water-soluble, organic nitrogen compound capable of reversibly reacting with formaldehyde at temperatures below 30° C. to form a water-soluble compound, adjusting the acidity of the resulting solution to a pH within the range of 2-7 and heating said solution substantially to its boiling point before subjecting it to temperatures below 20° C.

4. A method for preventing polymer precipitation in an aqueous formaldehyde solution comprising adding thereto a substance capable of reversibly reacting with formaldehyde at temperatures below 30° C. to form a water soluble compound, said substance being added in an amount sufficient to thus react with all the formaldehyde available for paraform formation and maintaining said solution at a temperature above about 20° C. for at least 10 hours before subjecting it to lower temperatures.

5. A method for preventing polymer precipitation in an aqueous formaldehyde solution comprising adding thereto a substance capable of reversibly reacting with formaldehyde at temperatures below 30° C. to form a water soluble compound, said substance being added in an amount sufficient to thus react with all the formaldehyde available for paraform formation and heating said solution substantially to its boiling point before subjecting it to temperatures below 20° C.

6. A method for preventing polymer precipitation in an aqueous formaldehyde solution comprising adding thereto a substance capable of reversibly reacting with formaldehyde at temperatures below 30° C. to form a water-soluble compound, such substance being added in an amount sufficient to thus react with all the formaldehyde available for paraform formation and adjusting the acidity of the solution to a pH within the range of 2–7.

7. A method for preventing polymer precipitation in an aqueous formaldehyde solution comprising adding thereto stabilizing amounts of a compound selected from the group consisting of urea, thiourea, acetoxime, chloracetamide, diethyl thiourea, methyl urea, glycine, dimethylol urea, nitroguanidine, and formamide.

8. A method for preventing polymer precipitation in an aqueous formaldehyde solution comprising adding thereto stabilizing amounts of urea.

9. A method for preventing polymer precipitation in an aqueous formaldehyde solution comprising adding thereto stabilizing amounts of urea, and maintaining said solution at a temperature above about 20° C. for at least 10 hours before subjecting it to lower temperatures.

10. A method for preventing polymer precipitation in an aqueous formaldehyde solution comprising adding thereto 5–10% by weight of urea and heating said solution substantially to its boiling point before subjecting it to temperatures below 20° C.

11. A method for preventing polymer precipitation in an aqueous formaldehyde solution comprising adding thereto stabilizing amounts of thiourea.

12. A method for preventing polymer precipitation in an aqueous formaldehyde solution comprising adding thereto stabilizing amounts of thiourea, and maintaining said solution at a temperature above about 20° C. for at least 10 hours before subjecting it to lower temperatures.

13. A method for preventing polymer precipitation in an aqueous formaldehyde solution comprising adding thereto 5–10% by weight of thiourea and heating said solution substantially to its boiling point before subjecting it to temperatures below 20° C.

14. A method for preventing polymer precipitation in an aqueous formaldehyde solution comprising adding thereto stabilizing amounts of acetoxime.

15. A method for preventing polymer precipitation in an aqueous formaldehyde solution comprising adding thereto stabilizing amounts of acetoxime, and maintaining said solution at a temperature above about 20° C. for at least 10 hours before subjecting it to lower temperatures.

16. A method for preventing polymer precipitation in an aqueous formaldehyde solution comprising adding thereto 5–10% by weight of acetoxime, and heating said solution substantially to its boiling point before subjecting it to temperatures below 20° C.

17. A composition of matter comprising an aqueous solution of formaldehyde, to which has been added stabilizing amounts of a water-soluble, non-alkaline, organic nitrogen compound capable of reversibly reacting with formaldehyde at temperatures below 30° C. to form a water-soluble compound.

18. A composition of matter comprising an aqueous solution containing 30–37% by weight of formaldehyde to which has been added 5–10% by weight of a water-soluble, non-alkaline, organic compound capable of reversibly reacting with formaldehyde at temperatures below 30° C. to form a water-soluble compound.

19. A composition of matter comprising an aqueous solution containing 30–37% by weight of formaldehyde to which has been added 5–10% by weight of a water-soluble, non-alkaline, organic nitrogen compound capable of reversibly reacting with formaldehyde at temperatures below 30° C. to form a water-soluble compound, said solution having an acidity equivalent to a pH within the range of 2–7.

20. A composition of matter comprising an aqueous solution of formaldehyde to which has been added stabilizing amounts of a compound selected from the group consisting of urea, thiourea, acetoxime, chloracetamide, diethyl thiourea, methyl urea, glycine dimethylol urea, nitroguanidine, and formamide.

21. A composition of matter comprising an aqueous solution of formaldehyde to which has been added stabilizing amounts of urea.

22. A composition of matter comprising an aqueous solution containing 30–37% by weight of formaldehyde to which has been added 5–10% by weight of urea.

23. A composition of matter comprising an aqueous solution containing 30–37% by weight of formaldehyde to which has been added 5–10% by weight of urea, said solution having an acidity equivalent to a pH within the range of 2–7.

24. A composition of matter comprising an aqueous solution of formaldehyde to which has been added stabilizing amounts of thiourea.

25. A composition of matter comprising an aqueous solution containing 30–37% by weight of formaldehyde to which has been added 5–10% by weight of thiourea.

26. A composition of matter comprising an aqueous solution containing 30–37% by weight of formaldehyde to which has been added 5–10% by weight of thiourea, said solution having an acidity equivalent to a pH within the range of 2–7.

27. A composition of matter comprising an aqueous solution of formaldehyde to which has been added stabilizing amounts of acetoxime.

28. A composition of matter comprising an aqueous solution containing 30–37% by weight of formaldehyde to which has been added 5–10% by weight of acetoxime.

29. A composition of matter comprising an aqueous solution containing 30–37% by weight of formaldehyde to which has been added 5–10% by weight of acetoxime, said solution having an acidity equivalent to a pH within the range of 2–7.

JOSEPH FREDERIC WALKER.